US011017348B1

(12) United States Patent
Brooks et al.

(10) Patent No.: US 11,017,348 B1
(45) Date of Patent: *May 25, 2021

(54) ON DEMAND LOCKER SYSTEM AND RELATED METHODS FOR DELIVERING A PACKAGE

(71) Applicant: Amazon Technologies, Inc., Seattle, WA (US)

(72) Inventors: Jason Lee Brooks, Seattle, WA (US); Christa Stephens Glenn, Seattle, WA (US); Eric George Wallinger, Seattle, WA (US); Jonathan Pennucci Alexander, Seattle, WA (US); Thomas Emmanuel Van de Velde, Seattle, WA (US); Ripley Graeme MacDonald, Seattle, WA (US); Nicholas Groenke, Seattle, WA (US); Christopher David Brown, Seattle, WA (US); Christopher A. Heilman, Pittsburgh, PA (US); Stephen Michael Kidson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,300

(22) Filed: Oct. 7, 2019

Related U.S. Application Data

(63) Continuation of application No. 14/538,295, filed on Nov. 11, 2014, now Pat. No. 10,482,420.

(51) Int. Cl.
*G06Q 10/08* (2012.01)

(52) U.S. Cl.
CPC ............................ *G06Q 10/0836* (2013.01)

(58) Field of Classification Search
CPC .................................................. G06Q 10/0836
See application file for complete search history.

(56) References Cited

U.S. PATENT DOCUMENTS

| 3,618,740 | A | | 11/1971 | Taverna |
| 4,435,027 | A | * | 3/1984 | Prather ............... E05B 65/0003 174/38 |
| 5,310,997 | A | | 5/1994 | Roach et al. |

(Continued)

OTHER PUBLICATIONS

Real-time split-delivery pickup and delivery time window problems with transfers by Sam R. Thangiah (Year: 2007).*

(Continued)

*Primary Examiner* — Jeff Zimmerman
*Assistant Examiner* — Zeina Elchanti
(74) *Attorney, Agent, or Firm* — Kilpatrick Townsend & Stockton LLP

(57) ABSTRACT

Methods and systems for delivering a package to a customer employ an on-demand locker assembly having a plurality of lockers. A computer-implemented method of staging delivery of a package to a customer includes displaying a network link that is selectable by the customer on an electronic client device. In response to selection of the network link, the package is transferred to one of the lockers. An access code for the locker is sent to the electronic client device. Upon entry of the access code, the locker is opened to provide the customer with access to the package to retrieve the package from the locker.

18 Claims, 9 Drawing Sheets

(56) References Cited

U.S. PATENT DOCUMENTS

| | | | | |
|---|---|---|---|---|
| 6,988,079 | B1* | 1/2006 | Or-Bach | G06Q 10/08 340/10.1 |
| 8,818,873 | B1* | 8/2014 | Kim | G06Q 30/0601 705/17 |
| 10,482,420 | B1* | 11/2019 | Brooks | G06Q 10/0836 |
| 2001/0042024 | A1* | 11/2001 | Rogers | G06Q 10/08 705/26.81 |
| 2004/0030604 | A1 | 2/2004 | Young et al. | |
| 2005/0286606 | A1 | 12/2005 | Ignatowicz | |
| 2006/0077038 | A1* | 4/2006 | Hopkins | G07C 9/33 340/5.73 |
| 2008/0022632 | A1 | 1/2008 | Gysi et al. | |
| 2012/0235786 | A1* | 9/2012 | Rudduck | G06Q 10/083 340/5.54 |
| 2014/0067618 | A1 | 3/2014 | Zhang et al. | |
| 2014/0316918 | A1 | 10/2014 | Zaniker et al. | |
| 2015/0371187 | A1* | 12/2015 | Irwin | G07F 9/002 705/72 |

OTHER PUBLICATIONS

U.S. Appl. No. 14/538,295, "On Demand Locker System and Related Methods for Delivering a Package", Nov. 11, 2014, 33 pages.

U.S. Appl. No. 14/538,295, "Advisory Action", dated Aug. 27, 2018, 3 pages.

U.S. Appl. No. 14/538,295, "Advisory Action", dated Oct. 17, 2017, 3 pages.

U.S. Appl. No. 14/538,295, "Final Office Action", dated Jul. 28, 2017, 35 pages.

U.S. Appl. No. 14/538,295, "Final Office Action", dated Jun. 1, 2018, 42 pages.

U.S. Appl. No. 14/538,295, "Non Final Office Action", Apr. 7, 2017, 32 pages.

U.S. Appl. No. 14/538,295, "Non Final Office Action", dated Nov. 16, 2017, 35 pages.

U.S. Appl. No. 14/538,295, "Non-Final Office Action", dated Jan. 5, 2015, 13 pages.

U.S. Appl. No. 14/538,295, "Non-Final Office Action", dated Dec. 28, 2018, 40 pages.

U.S. Appl. No. 14/538,295, "Notice of Allowance", dated Jul. 16, 2019, 11 pages.

Ramani et al., "Bank Locker Security System Based on RFID and GSM Technology", International Journal of Computer Applications, vol. 57, No. 18, 2012, pp. 15-20.

* cited by examiner

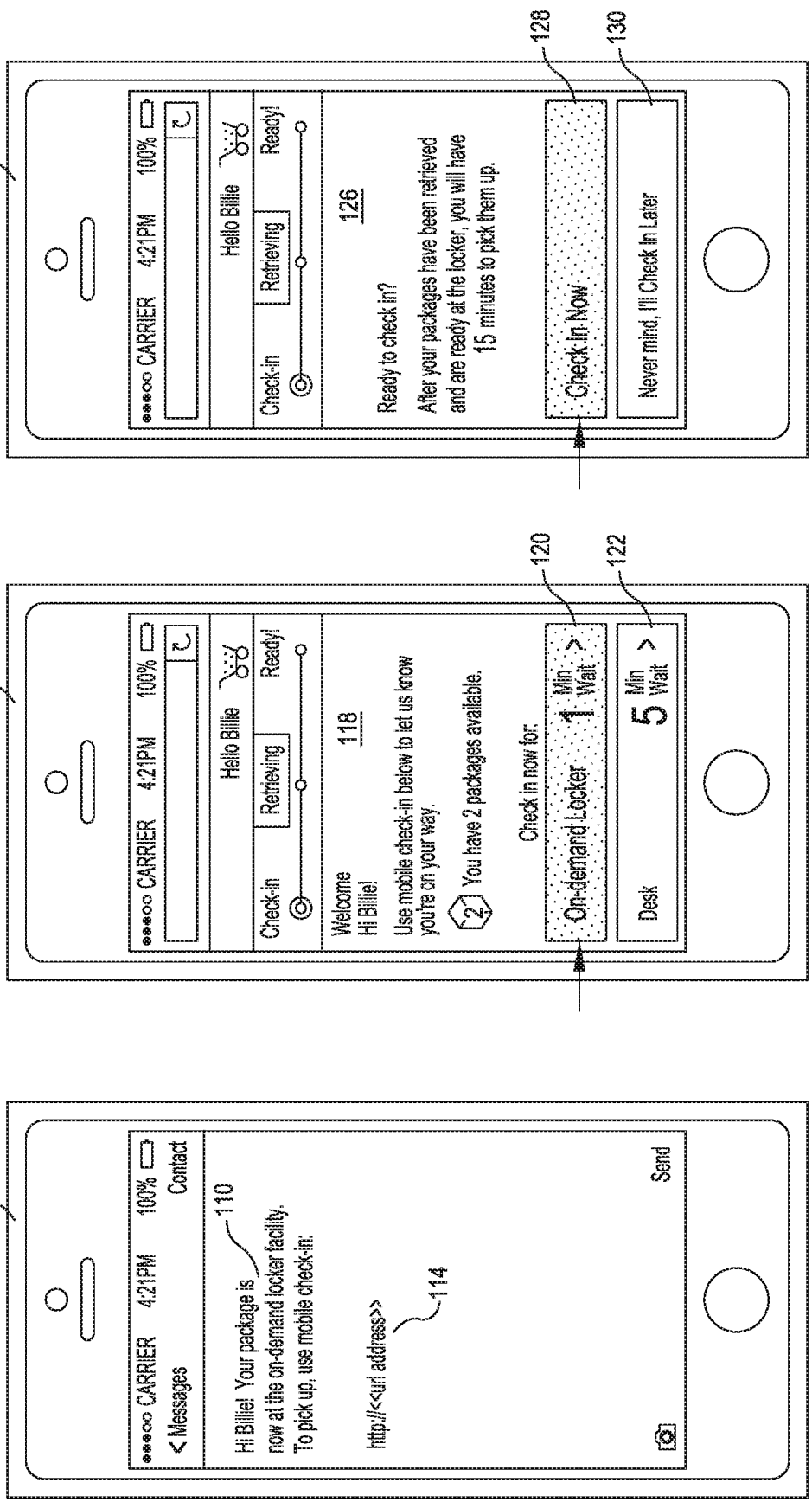

ON DEMAND LOCKER SYSTEM AND RELATED METHODS FOR DELIVERING A PACKAGE

CROSS REFERENCE TO RELATED APPLICATIONS

This application is a Continuation of U.S. application Ser. No. 14/538,295, filed Nov. 11, 2014, issued as U.S. Pat. No. 10,482,420 on Nov. 19, 2019, and titled "ON DEMAND LOCKER SYSTEM AND RELATED METHODS FOR DELIVERING A PACKAGE", the contents of which are herein incorporated in its entirety.

BACKGROUND

Online purchases have increased substantially in recent years. Factors contributing to the growth of online purchases include increased selection, the ability to compare offer prices, access to product comparison information such as consumer reviews, and increased convenience in not having to spend the time and expense associated with traveling to and purchasing a product at a traditional brick and mortar store. Often, a product purchased online is shipped directly to the purchaser, thereby further increasing convenience.

Shipping a purchased item(s) directly to a purchaser, however, adds to the overall cost of the purchase. Shipping cost can be substantial with certain purchased items, such as with heavy and/or bulky items. As a result, many online sellers offer free or reduced priced shipping to ship the purchased item(s) to a facility near the purchaser for pickup by the purchaser. For example, many brick and mortar store chains offer online purchase of items with free or reduced price shipping of the purchased item(s) to a store selected by the purchaser for pickup by the purchaser. While such reduced or free shipping serves to reduce shipping costs, the convenience of such a delivery approach is reduced as the purchaser has to travel to the selected store and often has to spend a substantial amount of time within the store to pick up the purchased item(s). As a result, there is a need for improved approaches for delivering items purchased online to a purchaser.

BRIEF DESCRIPTION OF THE DRAWINGS

Various embodiments in accordance with the present disclosure will be described with reference to the drawings, in which:

FIG. 6 shows an example text message notification that a purchased item has arrived at a selected on-demand locker facility for pick up by the purchaser, in accordance with many embodiments.

FIG. 7 shows an example retrieval options page for selecting how to pick up a purchased item from the selected on-demand locker facility, in accordance with many embodiments.

FIG. 8 shows an example check in page for picking up a package from a locker at the selected on-demand locker facility, in accordance with many embodiments.

DETAILED DESCRIPTION

Figure 1:
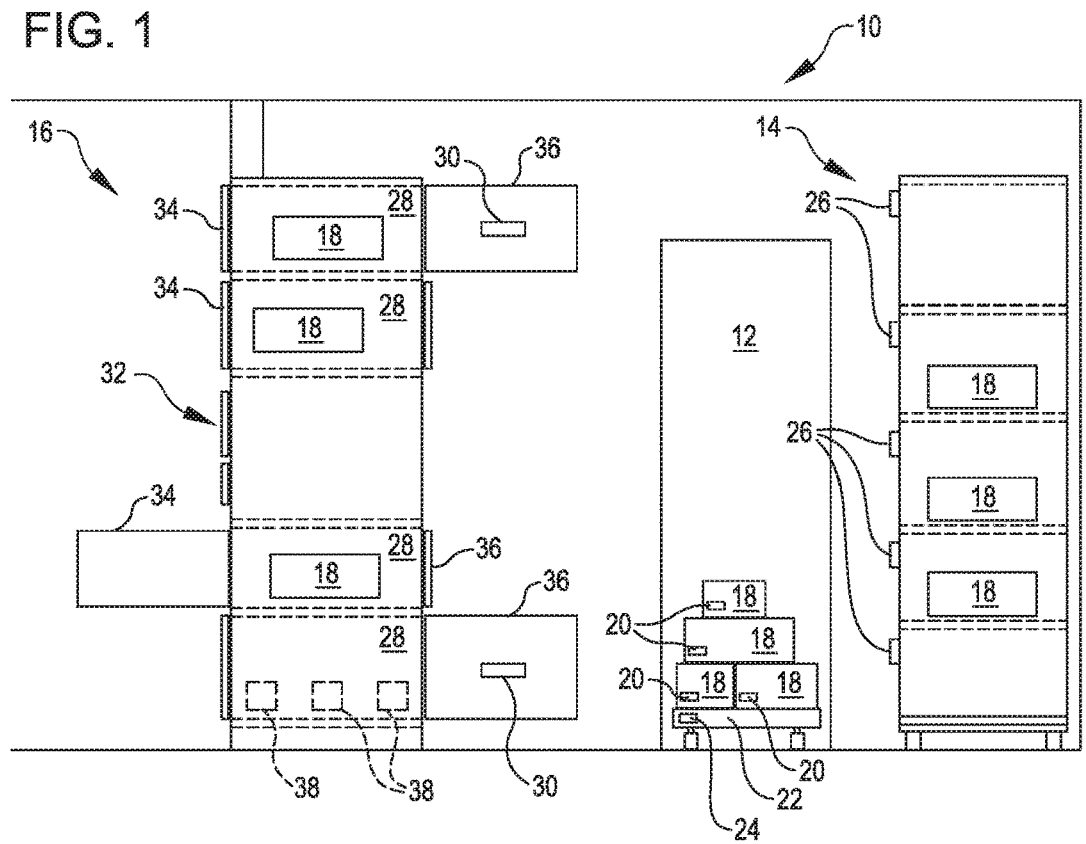
FIG. 1 illustrates an on-demand locker facility for delivering purchased items to purchasers via lockers, in accordance with many embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches and related systems are described herein for processing of packages for pickup by customers from a selected facility. In many embodiments, a purchaser of an item via an online retailer selects to have the purchased item shipped to a designated on-demand locker facility from which the purchaser will pick up the package via a locker. Upon arrival at the designated facility, a notification is sent to the purchaser that the package has arrived at the designated facility. The purchaser is provided with a link that the customer can select to "check in" and thereby initiate staging of the purchased item(s) into a locker of the on-demand locker facility for retrieval by the purchaser. In response to the customer checking in, the package is placed into the locker and the purchaser is sent a notification that the purchased item(s) is ready to be retrieved from the locker and an access code for use in gaining access into the locker to retrieve the purchased item(s). The purchaser enters the access code into an input device co-located with the locker, thereby causing the locker to open. After retrieval of the purchased item(s) from the locker by the purchaser, a notification can be sent to the purchaser that the pickup of the purchased item(s) has been accomplished. By requiring that purchasers check in prior to staging their purchased items into lockers of the on-demand locker facility, high throughput and reduced wait times can be realized.

Thus, in one aspect, a computer-implemented method is provided for delivering a package to a customer. The method includes receiving an instruction from a customer via a network, e.g., the internet, to ship a package to an on-demand locker facility from which the package can be picked up by the customer. The package is sent to the facility, received into the facility, and moved to a storage location within the facility. An identification of the package and an identification of the storage location are stored in a memory storage device. The customer is notified via the network that the package has arrived at the facility. A network link is provided that is selectable by the customer to enable the customer to check in. In response to the customer checking in, the package identification and associated storage location identification are retrieved from the memory storage device for use in retrieving the package from the storage location. The package is then placed into a locker of the on-demand locker facility having a closed configuration that blocks access to the package by the customer. In many implementations, the locker is one of a plurality of lockers of the on-demand locker facility. The customer is sent an access code via the network for use by the customer in gaining access to the locker to retrieve the package. Entry of the access code is received via an input device co-located with the lockers. In response to the entry of the access code, the locker is reconfigured from the closed configuration into an open configuration that provides the customer with access to the package to retrieve the package from the locker.

In many implementations, estimated wait times are provided to the customer. For example, after the customer has checked in, an estimated wait time before the customer can retrieve the package from the locker can be transmitted for to the customer.

In many implementations, the lockers and the input device form part of a barrier wall having a front side and a back side. The front side of the barrier wall is accessible to the customer for entry of the access code and retrieval of the package. The back side of the barrier wall is inaccessible to the customer and configured for placement of the package into the locker, e.g., by manual, semi-automated or automated processes or mechanisms.

In many implementations, the access code is displayed on a display of a mobile device used by the customer. The displayed access code is then scanned to accomplish entry of the access code to gain access to the locker to retrieve the package.

In many implementations, the computer-implemented method for delivering a package to a customer further includes sensing removal of the package from the locker. A message can be transmitted to the customer via the network indicating that the package has been picked up.

In another aspect, a computer-implemented method is provided for delivering a package to a customer. The method includes receiving the package into an on-demand locker facility. The customer is notified that the package has arrived at the facility. A check-in notification is received from the customer. In response to receiving the customer check-in notification, the package is placed into a locker of the on-demand locker facility having a closed configuration that blocks access to the package by the customer. The customer is sent an access code for use by the customer in retrieving the package from the locker. Entry of the access code by the customer is received. In response to receipt of the entry of the access code, the locker is reconfigured so that the customer can retrieve the package from the locker.

In many implementations, the computer-implemented method for delivering a package to a customer further includes additional acts. For example, the method can include receiving an instruction from the customer to ship the package to the facility. The package is shipped to the facility. The package is moved to a storage location within the facility. An identification of the package and an identification of the storage location are stored in a memory storage device. In response to the customer checking in, the package identification and associated storage location identification are read from the memory storage device for use in retrieving the package from the storage location for placement into the locker.

In many implementations, related time periods are provided to the customer. For example, after the customer has checked in, an estimated wait time before the customer can retrieve the package from the locker can be transmitted to the customer. The customer can be informed of a time period for picking up the package from the locker. Elapsed time from the sending of the access code to the customer can be tracked. If the customer has not retrieved the package from the locker prior to elapsing of the time period, an indication can be provided that the package can be retrieved from the locker to enable use of the locker in delivering another package. Upon elapsing of the time period: a) the package can be retrieved from the locker to enable use of the locker in delivering another package, b) the customer can be notified that the time period has elapsed, and/or c) the customer can be prompted to check in again if the customer wants to retrieve the package from the facility. In response to receiving a customer check-in notification: a) the customer can be notified that the package is being retrieved; and/or b) the customer can be notified of an estimated time period until the package will be ready for pickup by the customer.

In another aspect, a computer-implemented method is provided for delivering a package to a customer. The method includes receiving an instruction from a customer via the network to ship a package to an on-demand locker facility from which the package can be picked up by the customer. The package is received into the facility and moved to a storage location within the facility. The customer is notified via the network that the package has arrived at the facility. The customer is prompted to check in to pick the package up from a locker of the on-demand locker facility or a pickup desk. An estimated wait time for picking the package up from the locker and an estimated wait time for picking the package up from the pickup desk are displayed. If the customer checks in to retrieve the package from the pickup desk, the package is retrieved from the storage location for delivery to the customer via the pickup desk, the customer is notified that the package is ready for the customer to pick up via the pickup desk, and the package is delivered to the customer via the pickup desk. If the customer checks in to retrieve the package from the locker: a) the package is retrieved from the storage location for delivery to the customer via the locker, b) the package is placed into a locker having a closed configuration that blocks access to the package by the customer, the locker being one of a plurality of lockers, c) the customer is sent an access code via the network for use by the customer in gaining access to the locker to retrieve the package, d) entry of the access code is received via an input device co-located with the lockers, and e) in response the entry of the access code, the locker is reconfigured from the closed configuration into an open configuration that provides the customer with access to the package to retrieve the package from the locker.

In another aspect, a system is provided for delivering a package to a customer. The system includes a plurality of lockers and a server operatively coupled with a network, e.g., the internet. The lockers form at least part of a barrier having a front side and a back side. The front side of the barrier is accessible to the customer for retrieval of the package from one of the lockers. The backside of the barrier is configured for placement of packages into the lockers. The server includes one or more processors and memory storing instructions that when executed by the one or more processors cause the one or more processors to: a) receive an instruction from a customer via the network to ship a package to a facility that includes the lockers, b) notify the customer via the network that the package has arrived at the facility, c) provide a network link that is selectable by the customer to enable the customer to check in to select pickup of the package via one of the lockers, and d) in response to the customer selecting pickup via one of the lockers, output an instruction causing the package to be placed into one of the lockers and send the customer an access code via the network for use by the customer to gain access to the locker to retrieve the package. In many implementations, the backside of the barrier is inaccessible to the customer.

In many implementations, entry of the access code causes reconfiguration of the locker to give access to the customer to retrieve the package from the locker. For example, each of the lockers can include a front door that automatically opens in response to input of an access code corresponding to a package placed within the locker to provide access to the customer to retrieve the package from the locker.

In many implementations, each of the lockers includes one or more sensors configured to sense if a package is disposed within the locker. The instructions, when executed by the one or more processors, can further cause the one or more processors to receive a signal generated via the one or more sensors indicating removal of the package from the locker and/or transmit a message to the customer via the network indicating that the package has been picked up.

In many implementations of the system, each of the lockers includes a rear door reconfigurable between an open configuration enabling placement of a package into the locker and a closed configuration inhibiting the ability for a customer to see through the locker and blocking access through the locker. The backside barrier can automatically reconfigure from the closed configuration to the open configuration upon closing of the front door.

In many implementations of the system, one or more estimated wait times are transmitted to the customer. For example, the instructions can further cause the one or more processors to cause transmission to the customer of an estimated wait time before the customer can retrieve the package from the locker.

In many implementations of the system, a storage location of the package within the facility is entered, stored, and retrieved for use in staging the package during the delivery process. For example, the instructions can further cause the one or more processors to: a) receive and store an identification of the package and an identification of a storage location where the package is stored within the facility to a memory device, and b) retrieve the package identification and associated storage location identification from the memory device in response to the customer selection to pick up the package via a locker for use in retrieving the package from the storage location for placement into the locker.

In many implementations of the system, the customer is allotted at least a predetermined amount of time to retrieve the package from the locker. For example, the instructions can further cause the one or more processors to: a) receive an input indicating that the package has been placed within the locker, b) transmit a time period for picking up the package to the customer, c) track elapsed time from the placement of the package into the locker, d) if the elapsed time exceeds a predetermined time period, output an indication that the package can be removed from the locker to enable use of the locker to deliver another package, and e) if the package is removed from the locker to enable use of the locker to deliver another package, notify the customer that the time period for picking up the package has elapsed and prompt the customer to check in again if the customer wants to retrieve the package from the facility.

In many implementations of the system, the instructions further cause the one or more processors to transmit a notification to the customer that the package is being retrieved. An estimation of the amount of time to the customer that will elapse before the package is ready for pickup by the customer can also be transmitted to the customer.

In many implementations of the system, the customer is given the option to pick up the package from a package pickup desk. For example, the instructions can further cause the one or more processors to: a) provide network link that is selectable by the customer to enable the customer to check in to select pickup of the package via a pickup desk, b) display an estimated wait time for picking up the package from the pickup desk, c) if the customer checks in to select pickup of the package via the pickup desk, output an instruction causing the package to be staged within the facility for delivery via the pickup desk, d) receive an input indicating that the package has been staged for delivery to the customer via the pickup desk, and e) in response to receiving the input that the package has been staged for delivery via the pickup desk, transmit a notification to the customer that the package is ready for pickup via the pickup desk.

In many implementations, the system further includes an input device co-located with the lockers and operatively connected with the server via the network. The input device can be configured to scan the access code from a display of a mobile device used by the customer.

Turning now to the drawings, in which like reference numerals represent like parts throughout the several views, FIG. 1 shows an on-demand locker facility 10, in accordance with many embodiments. The on-demand locker facility 10 includes a package reception 12, package storage 14, and an on-demand locker assembly 16. A customer is given the option to have a package shipped to the on-demand locker facility 10 to be picked up therefrom.

In many implementations, each of the packages 18 that are shipped to the facility includes a suitable identification label 20 (e.g., a label including a bar code) that identifies the package 18. As part of the intake of the packages 18 into the facility 10 via package reception 12, the identification label 20 can be scanned using a hand-held scanning device to record arrival of the packages 18 at the facility 10. In response to arrival of the package 18 at the facility 10, a notification can be sent to the customer to inform the customer that the package has arrived at the facility 10.

One or more of the packages 18 can be placed onto a movable cart or pallet 22. The cart 22 can have an identification tag 24 that includes a suitable identification code such as bar code. The identification tag 24 can be scanned using the hand-held device to record that the packages 18 are located on the cart 22. The cart 22 can be moved to a desired location within the facility 10. For example, the package storage 14 can be configured to accommodate the cart 22 and the packages 18 contained thereon. The package storage 14 includes location identification tags 26, which can be scanned using the hand-held device to record the location of the cart 22 and/or one or more packages 18 transferred from the cart 22 to a specific location within the package storage 14. The recorded location of the package 18 within the package storage 14 can then be used to determine the location of any particular package stored within the package storage 14.

In response to a check in notification from the customer indicating that the customer wants to retrieve a package from the facility 10 via a locker, instructions are displayed or transmitted to a worker in the facility 10 to cause a package to be moved from the package storage 14 into a locker 28 of the locker assembly 16. The displayed instructions can include the location in the package storage 14 where the package is stored and the identification code of the package 18 to be moved. The displayed instructions can further include an identification of a particular locker 28 into which the package 18 should be placed. Alternatively, the package can be moved into any suitable available locker and an identification tag 30 of the locker 28 used can be scanned with the hand-held device to record the locker 28 into which the package has been placed.

In many implementations, the locker assembly 16 has a plurality of lockers 28 and a customer input/output device 32. Each of the lockers 28 includes a front door 34, a back door 36, and defines an interior volume within. Each of the lockers 28 can include one or more package sensors 38, which can be any suitable sensor configured to detect the presence and/or absence of a package within the locker 28. For example, the sensors 38 can include a light emitting element on one side of the locker 28 and a light detecting sensor on an opposite side of the locker relative to the light emitting element, a weight or pressure sensor, a proximity sensor, or other sensors. In the illustrated configuration, the bottom locker 28 is empty and available to receive a package. The back door 36 of any available locker 28 can be placed in an open configuration, as shown for the bottom locker, thereby allowing direct placement of a package 18 into the locker 28. Alternatively, the back door 36 can be selectively opened by facility personnel just prior to placing the package 18 into the locker 28. The top locker 28 shows a package 18 disposed therein prior to closing of the back door 36. The second from the top locker 28 shows a package disposed therein after closing of the back door 36. The package 18 in the second from the top locker 28 is ready to be retrieved by the customer. Once the package 18 has been placed into a locker 28 and is ready to be retrieved by the customer, a notification is sent to the customer that the package is ready to be picked up and includes an access code that the customer enters via the customer input/output device 32 to open the locker to retrieve the package 18 therefrom. For example, in response to entry of the access code by the customer, the front door 34 can be automatically opened to give the customer access to the locker 28 as illustrated in the third from the top locker 28. Removal of the package from the locker 28 can be verified via the sensors 38. Following removal of the package 18 from the locker 28, a notification can be sent to the customer documenting completion of the delivery of the package 18.

In many implementations, the customer is given at least a suitable predetermined period of time to retrieve the package from the locker once the package has been placed into the locker. For example, the customer may be given at least 15 minutes to retrieve the package. Such a time limit can be used to avoid inflicting longer wait times on other customers that might arise if too many lockers are unavailable for use in delivering additional packages due to already containing a package over an extended period of time. If a package has not been picked up after the predetermined pickup time period, the package can be removed from the locker and placed back into storage in the package storage 14 to make the locker available to deliver another package to another customer.

Figure 2:
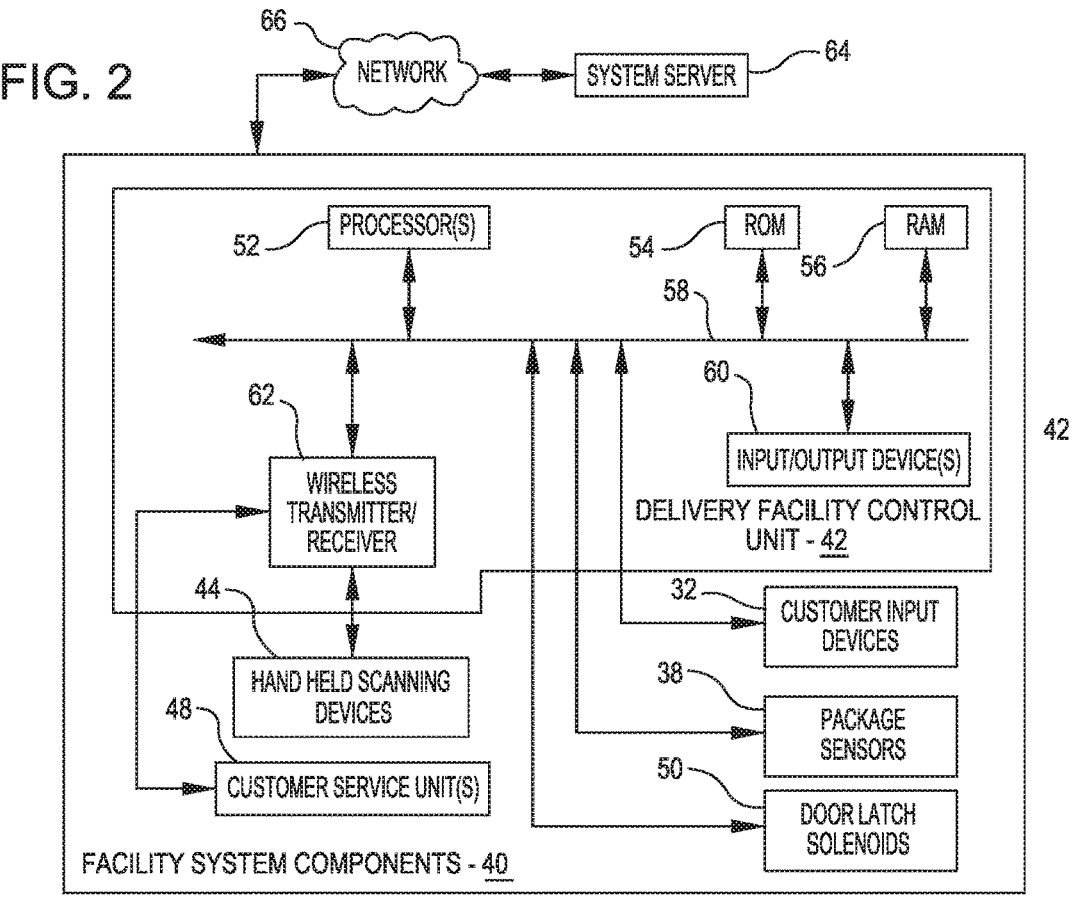
FIG. 2 is a simplified schematic diagram of system components of the on-demand locker facility of FIG. 1, in accordance with many embodiments.

FIG. 2 shows a schematic representation of system components 40 of the on-demand locker facility 10 of FIG. 1, in accordance with many embodiments. In addition to the other components of the on-demand locker facility 10 described herein, the system components 40 include a delivery facility control unit 42, imaging devices or hand-held scanning devices 44, customer input/output devices 32, locker package sensors 38, customer service units 48, and door latch solenoids 50.

The delivery facility control unit 42 controls operational aspects of the on-demand locker facility 10. The control unit 42 includes one or more processors 52, read-only memory (ROM) 54, random access memory (RAM) 56, communication bus 58, one or more input/output devices 60, and a wireless transmitter/receiver 62. The control unit 42 is communicatively coupled with one or more system servers 64 via a communication network 66. The one or more processors 52 can execute instructions stored in the ROM 54 and/or the RAM 56 so as to at least partially provide the functionality of the on-demand locker facility 10 as described herein. The one or more processors 52 are communicatively coupled with the ROM 54 and the RAM 56 via the communication bus 58.

The one or more processors 52 are communicatively coupled with the one or more input/output devices 60 via the communication bus 58. Any suitable type and/or number of input/output devices 60 can be used. For example, the input/output devices 60 can include a keyboard, mouse, display, printer, etc. The input/output devices 60 are configured to be used by one or more personnel operating the on-demand locker facility 10. Such personnel can accomplish any suitable tasks, including receipt of packages into the facility 10, scanning of identification labels of packages received and/or otherwise processed within the facility 10, moving of packages into/out of temporary storage within the facility 10, moving of packages into/out of the locker assembly 16, etc.

The one or more processors 52 are communicatively coupled with the wireless transmitter/receiver 62 via the communication bus 58. The wireless transmitter/receiver 62 provides wireless communication between the one or more processor(s) 52 and the hand-held scanning devices 44 and any other input/output devices that may be used with the on-demand locker facility 10, such as one or more customer service units 48. The hand-held scanning devices 44 are used by personnel operating the facility 10 to scan the identification labels 20 on packages, to scan the identification tags 24 on the carts 22, to scan the identification tags 26 of the package storage 14, and to scan the identification tags 30 of the lockers of the locker assembly 16. The one or more customer service units 48 can be used by personnel operating the facility 10 and/or by customers of the facility 10. The one or more customer service units 48 can be any suitable input/output device configured to enable any of the communications described herein with respect to communication between a user and/or personnel operating the facility 10 and the delivery facility control unit 42 and/or the system server 64.

The one or more processors 52 are communicatively coupled with the customer input/output devices 32, the package sensors 38, and the door latch solenoids 50 via the communication bus 58. In many embodiments, the door latch solenoids 50 are used to selectively open the front doors 34 in response to customer input of an access code so as to give the customer access to retrieve one or more packages from the locker assembly 16. The one or more processors 50 can be communicatively coupled with the customer input/output devices 32 and/or the package sensors 38 via any suitable communication link (e.g., communication cable, via the wireless transmitter/receiver 60). The customer input/output devices 32 can be integral with the on-demand locker facility, or can also be separate, mobile devices, e.g., customers' mobile devices with corresponding functionality. For example, a customer may use an application(s) on their personal mobile device, e.g., a smartphone, to interact with the control unit 42.

Figure 3:
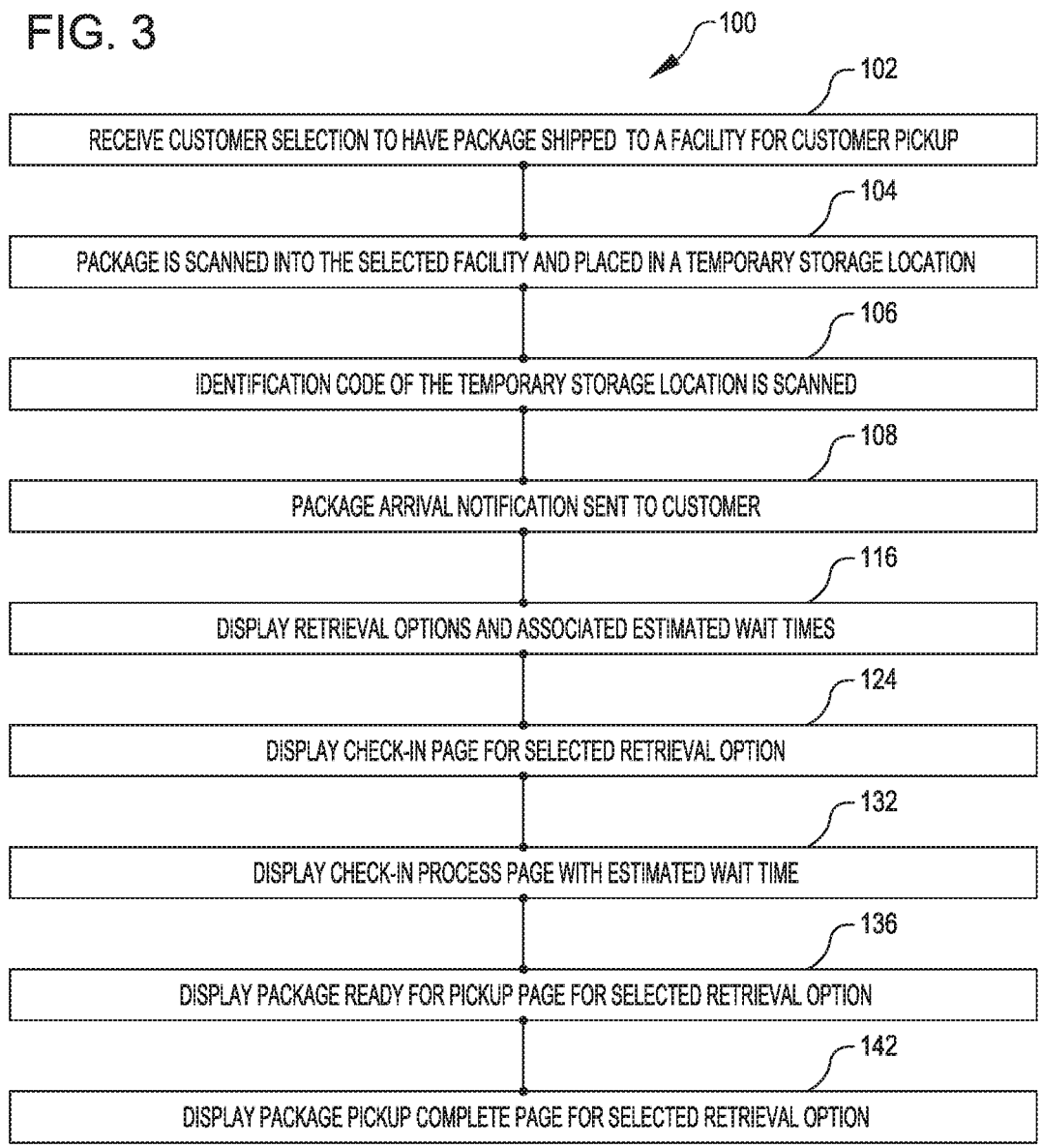
FIG. 3 is a simplified schematic diagram of an approach for delivering a purchased item to a purchaser, in accordance with many embodiments.
Figure 4:
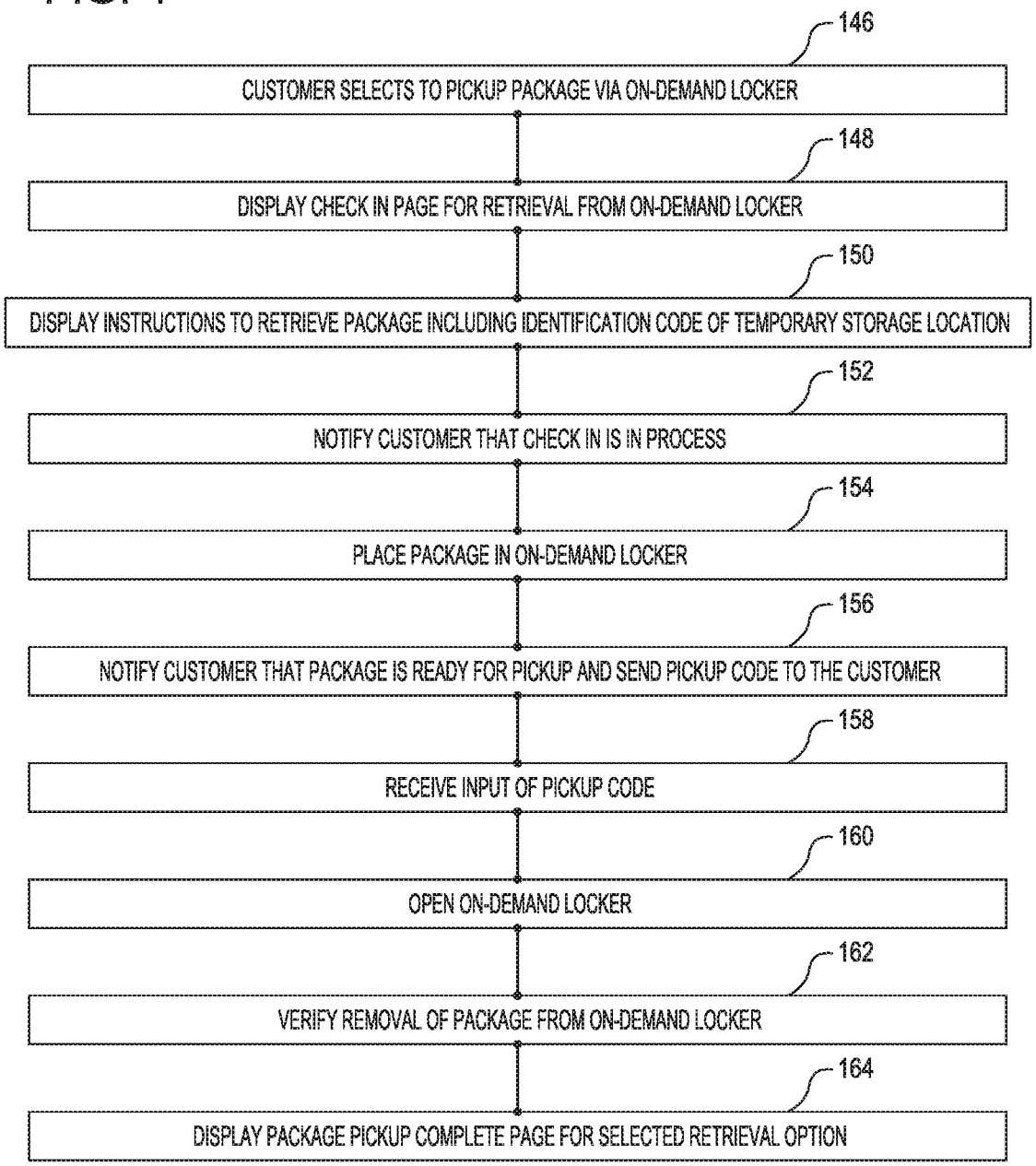
FIG. 4 is a simplified schematic diagram of acts of an approach for delivering a purchased item to a purchaser via pick up from a locker, in accordance with many embodiments.
Figure 5:
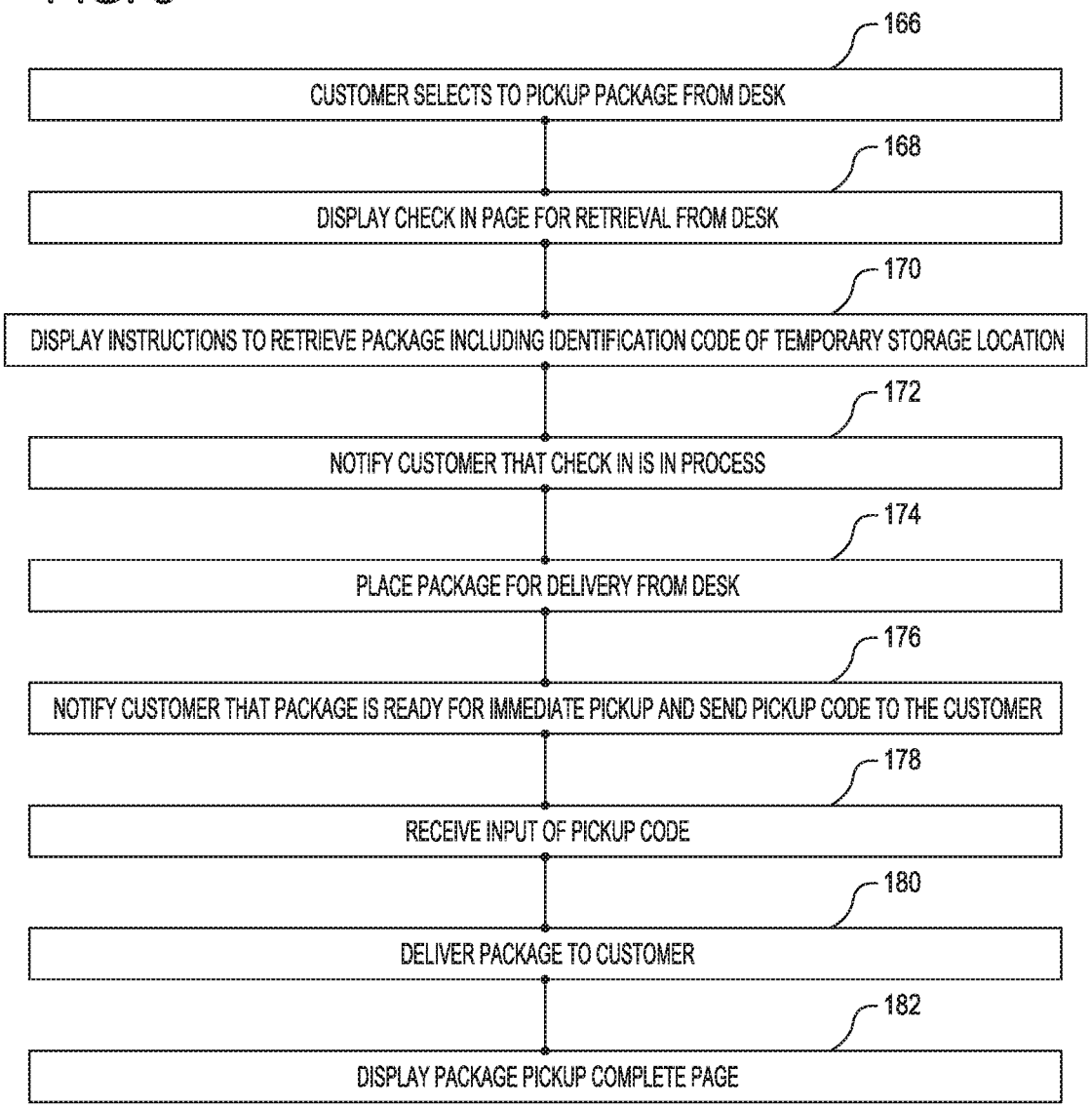
FIG. 5 is a simplified schematic diagram of acts of an approach for delivering a purchased item to a purchaser via pick up from a delivery desk, in accordance with many embodiments.

FIG. 3, FIG. 4 and FIG. 5 summarize acts of an approach 100 for delivering a purchased item to a purchaser, in accordance with many embodiments. Some or all of the process 100 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. For example, some or all of the process 100 can be accomplished using the system components 40 and/or the on-demand locker facility 10 described herein.

The process 100 includes receiving a customer selection to have one or more packages shipped to a facility for customer pickup (act 102). For example, after making an online purchase of a product, the customer can be presented with shipping options that include having a package containing the purchased item(s) shipped to a customer designated facility for customer pickup therefrom. As described herein, such a selection may often be associated with free or reduced shipping charges in comparison with having the purchased item(s) shipped to the customer's residence.

Upon arrival at the facility 10, the package is scanned into the selected facility and placed in a temporary storage location (act 104). For example, the identification label 20 on a package 18 can be scanned using the hand-held scanning device 44. The package 18 can be placed on the cart 22 and the identification tag 24 scanned using the hand-held scanning device 44. Data corresponding to the identification label 20 and the identification tag 24 can be stored in RAM 56 and/or transmitted via the communication network 66 to the one or more system servers 64 for processing and/or storage for future processing.

The package 18 can then be moved to a temporary storage location. The temporary storage location for the package can be recorded by scanning an identification code associated with the temporary storage location for the package (act 106). For example, the package 18 can be moved for storage in the package storage 14 and the hand-held scanning device 44 used to scan the identification tag 26 for the storage location in which the package 18 is placed. Alternatively, the cart 22 on which the package 18 is disposed can be moved to the package storage 14 and the hand-held scanning device used to scan the identification tag 26 for the location in which the cart 22 is parked. Data corresponding to the identification tag 26 can be stored in RAM 56 and/or transmitted via the communication network 66 to the one or more system servers 64 for processing and/or storage for future processing.

In response to the arrival of the package at the facility 10, a package arrival notification is sent to the customer (act 108). Any suitable notification can be used such as, for example, a text message, an email, a voice mail message, etc. FIG. 6 shows an example text message package arrival notification 110 displayed on a customer's device, e.g., a mobile device or smart phone 112. The text message 110 includes a selectable hypertext 114 that can be selected by the customer to "check in" during the package pickup process. For customer check in without use of a smart phone, other suitable approaches can be used to enable the customer to check in during the package pickup process. For example, a customer kiosk can be provided for use by the customer to check in via a suitable input/output device, such as via a customer accessible computer terminal including a display and an input device, such as a touch screen and/or keyboard.

The process 100 includes displaying retrieval options and associated estimated wait times (act 116). For example, upon selection of the hypertext link 114, a retrieval options web page 118 such as shown in FIG. 7 can be displayed on the customer's smart phone 112. In the illustrated embodiment, the retrieval options web page 118 informs the customer of the number of packages that are at the facility 10 and available to pick up. The web page 118 also includes a selectable link 120 that can be selected by the customer to proceed with picking up the package(s) via the locker assembly 16, as well as a display of an estimated wait time before the package(s) will be disposed within the locker assembly 16 and ready for retrieval by the customer. The web page 118 also includes a selectable link 122 that can be selected by the customer to proceed with picking up the package(s) via a manned pickup desk, as well as a display of an estimated wait time before the package(s) will be ready for retrieval by the customer from the manned pickup desk. A customer accessible kiosk can also be used to display retrieval options and associated estimated wait times to the customer.

The process 100 includes displaying a check in page for the selected retrieval option (act 124). For example, FIG. 8 shows a check in page 126 for retrieval of the package(s) via the locker assembly 16. A similar check in page for retrieval of the package(s) via the manned pick up desk can alternatively be displayed. The check in page 126 includes a selectable link 128 that the customer can select to initiate retrieval and staging of the package(s) from the package storage 14 into the locker assembly 16. The check in page 126 can also inform the customer of a time limit for picking up the package. The package can be left within the locker assembly 16 for at least the time limit and optionally removed and placed back into the package storage 14 if not picked up from the locker assembly 16 within the time limit so as to not slow the delivery of other packages via the locker assembly 16. The check in page 126 includes a selectable link 130 that the customer can select if the customer is not ready to initiate staging of the package(s) from the package storage 14 into the locker assembly 16. A customer accessible kiosk can also be used to display a check in page for the selected retrieval option.

Figure 9:
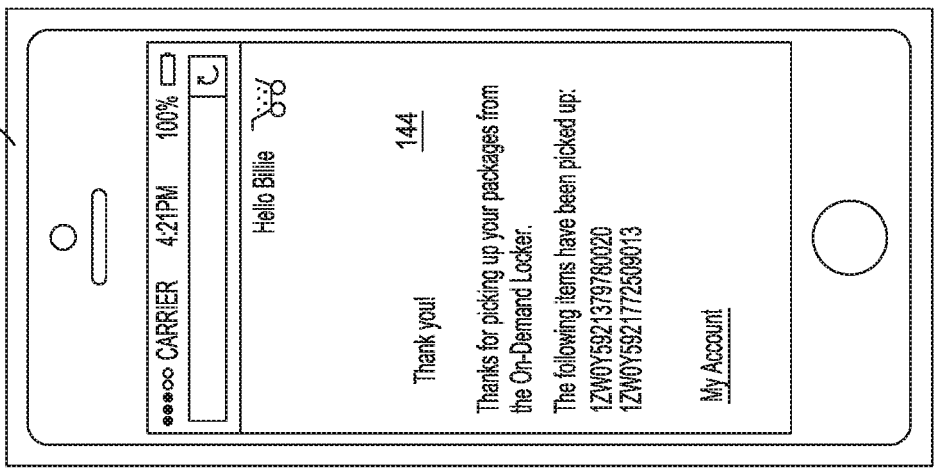
FIG. 9 shows an example page notifying the purchaser that the package is being retrieved and displaying an estimated wait time until the package is ready for pickup, in accordance with many embodiments.

Upon selection of the selectable link 128, 130, a check in in-process page with estimated wait time can be displayed (act 132). For example, FIG. 9 shows an example check in in-process page 134 that can be displayed upon selection of the selectable link 128. The page 134 informs the customer that the package is being retrieved and will be ready for customer pickup after a displayed estimated time period. A customer accessible kiosk can also be used to display a check in in-process page with estimated wait time.

Upon initiation of retrieval of the package(s), the location of the package(s) 18 in the package storage 14 is retrieved from memory and displayed to facility personnel for use in locating the package. The package(s) 18 is then retrieved from the package storage 14 and staged for delivery per the customer's selected delivery option. For example, when delivery via the locker assembly 16 is selected, the package(s) is moved from the package storage 14 into a locker of the locker assembly 16. The hand-held scanning device 44 can be used to scan the identification tag 30 of the locker into which the package(s) 18 is placed. Alternatively, when delivery via the manned pickup desk is selected, the package(s) can be staged from the package storage 14 to a suitable location accessible to the manned pickup desk for delivery to the customer therefrom.

Figure 10:
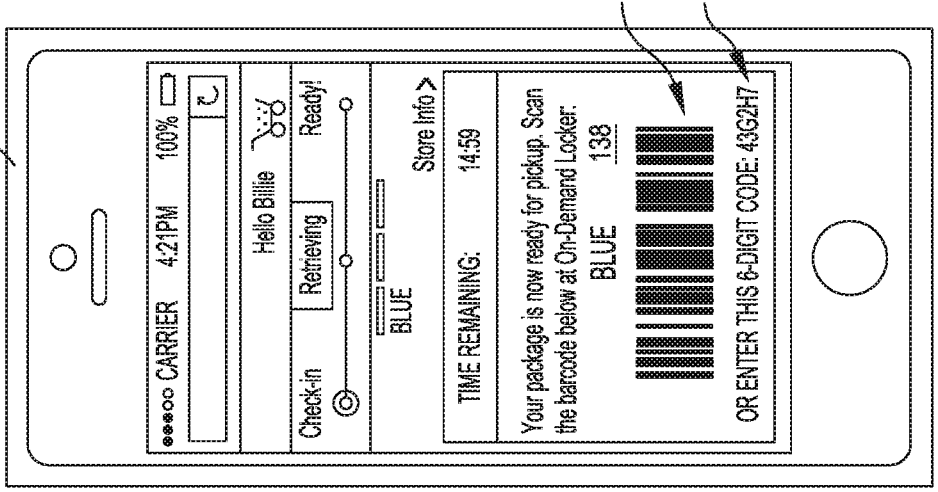
FIG. 10 shows an example page displaying a pickup code for use in gaining access to a locker in which the customer's package is located and a time remaining to pick up the package from the locker, in accordance with many embodiments.

Once the package has been staged for delivery via the selected delivery option, a package ready for pickup page for the selected retrieval option can be displayed (act 136). For example, FIG. 10 shows an example package ready for pickup page 138 that can be displayed on the customer's smart phone 112 when the customer has selected package retrieval via locker. The package ready for pickup page 138 can identify a particular locker or subset of lockers from which the package is to be retrieved (i.e., "BLUE"). The example page 138 also includes an identifier, e.g., a bar code 140, that can be input, e.g., scanned via a scanning unit included in the customer input device 32, and an access code 142, e.g., an alphanumeric code, that can be alternatively entered into the customer input device 32 by the customer. The customer uses the customer input device 32 to input the bar code 140 or the access code 142 to gain access to the locker to retrieve the package(s) 18. Upon entry of the bar code 140 or the access code 142, the door latch solenoid 50 for the specific locker containing the customer's package(s) 18 is actuated, thereby opening the front door 34 to enable the customer to retrieve the package(s) 18 from the locker. Removal of the package(s) 18 from the locker can be detected via the package sensors 38. When removal of the package(s) 18 is detected, subsequent closure of the front door 34 by the customer can be used to automatically open the back door 36 of the locker, thereby providing a visual indication to facility personnel of the availability of the locker for delivery of another package(s) 18. Alternatively, when the customer selects to retrieve the package(s) 18 via the manned pickup desk, a similar package ready for pickup page can be displayed. The bar code 140 or the access code 142 can be scanned by or provided to facility personnel manning the pickup desk to identify the customer so as to enable retrieval and delivery of the correct package(s) to the customer by the pickup desk personnel. A customer accessible kiosk can also be used to display a package ready for pickup page for the selected retrieval option.

Figure 11:
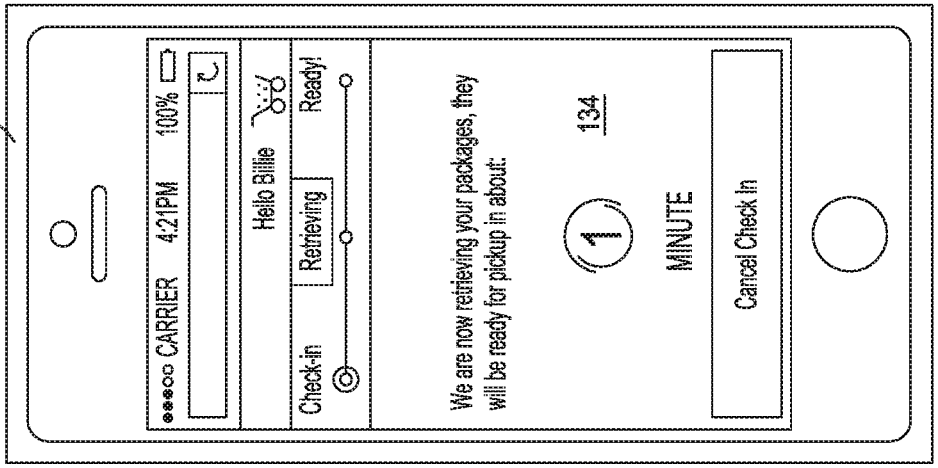
FIG. 11 shows an example package pickup complete page, in accordance with many embodiments.

When the package has been retrieved by the customer via the locker or picked up by the customer from the pickup desk, a package pickup complete page for the selected retrieval option can be displayed to the customer (act 142). For example, FIG. 11 shows the display of an example package pickup complete page 144 that can be displayed on the customer's smart phone 112 after the customer has picked up the package(s) 18. The example package pickup complete page 144 identifies the facility from which the package(s) 18 were picked up and the items that have been picked up. A customer accessible kiosk can also be used to display a package pickup complete page for the selected retrieval option.

FIG. 4 shows acts of the process 100 that can be applicable to package retrieval via the locker assembly 16. In act 146, the customer selects to pick up one or more packages from the customer selected facility via locker. Any suitable approach for selecting to pick up the one or more packages 18 via locker can be used. For example, the retrieval options web page 118 as shown in FIG. 7 can be used to present the customer with the selectable link 120 to select to retrieve the package(s) via locker. In act 148, a check in page for retrieval via locker is displayed. For example, the check in page 126 shown in FIG. 8 can be displayed. In act 150, in response to the customer checking in, instructions are displayed to personnel operating the facility 10 to move the package from the package storage 14 into one of the lockers. The location of the customer's package(s) 18 can be retrieved from memory and included in the instructions to the personnel so as to enable to the personnel to efficiently locate and retrieve the package(s) 18 from the package storage 14. In act 152, the customer is notified that the package is being retrieved. For example, the example check in in-process page 134 as shown in FIG. 9 can be displayed on the customer's smart phone 112. In act 154, the package is placed into one of the lockers. The identification tag 30 of the locker 28 used can be scanned with the hand-held device to record into which locker 28 the package is placed. In act 156, the customer is notified that the package is ready for pickup and is sent a pickup code. For example, the package ready for pickup page 138 shown in FIG. 10 can be displayed on the customer's smart phone 112. The package ready for pickup page 138 identifies a particular locker or subset of lockers from which the package is to be retrieved (i.e., "BLUE"). The example page 138 also includes an identifier, e.g., a bar code 140, that can be input, e.g., scanned via a scanning unit included in the customer input device 32, and an access code 142, e.g., an alphanumeric code, that can be alternatively entered into the customer input device 32 by the customer. In act 158, input of the pickup code is received, for example, via scanning of the bar code 140 or entry of the access code 142 into the customer input device 32. In act 160, in response to the entry of the pickup code, the front door 34 to the locker is opened. For example, entry of the pickup code can be used to identify which door latch solenoid to actuate so as to open the correct front door 34 for the locker containing the customer's package(s) 18. In act 162, removal of the customer's package(s) 18 from the locker is verified. Output from the package sensors 38 can be processed to verify removal of the package(s) 18. In act 164, the customer is notified that the customer's package(s) 18 have been picked up. For example, the example package pickup complete page 144 shown in FIG. 11 can be displayed on the customer's smart phone 112. The example package pickup complete page 144 identifies the facility from which the package(s) 18 were picked up and the item(s) that have been picked up.

FIG. 5 shows acts of the process 100 that can be applicable to package retrieval via the manned pickup desk. In act 166, a selection is received from the customer to pick up the package(s) 18 from the manned pickup desk. Any suitable approach for selecting to pick up the one or more package(s) 18 via the manned pickup desk can be used. For example, the retrieval options web page 118 as shown in FIG. 7 can be used to present the customer with the selectable link 122 to select to retrieve the package(s) via the manned pickup desk. In act 168, a check in page for retrieval via the manned pickup desk is displayed. In act 170, in response to the customer checking in, instructions are displayed to personnel operating the facility 10 to move the package(s) 18 from the package storage 14 to a suitable location for delivery to the customer via the manned pickup desk. The location of the customer's package(s) 18 can be retrieved from memory and included in the instructions to the personnel so as to enable to the personnel to efficiently locate and retrieve the package(s) 18 from the package storage 14. In act 172, the customer is notified that the package is being retrieved. The notification can include an estimated wait time before the package will be ready to be picked up from the manned pickup desk. For example, the example check in in-process page 134 as shown in FIG. 9 can be displayed on the customer's smart phone 112. In act 174, the package is moved to a suitable location for subsequent delivery from the manned pickup desk. In act 176, the customer is notified that the package is ready for pickup and is sent a pickup code. For example, the customer can be notified via the display on the customer's smart phone by a page similar to the package ready for pickup page 138 shown in FIG. 10 but adapted for the manned pickup desk as opposed to a locker. In act 178, input of the pickup code is received, for example, via scanning of the bar code 140 or entry of the access code 142 by personnel manning the pickup desk. In act 180, the package(s) 18 are delivered to the customer via the manned pickup desk. In act 182, the customer is notified that the customer's package(s) 18 has been picked up. For example, the example package pickup complete page 144 shown in FIG. 11 can be displayed on the customer's smart phone 112. The example package pickup complete page 144 identifies the facility from which the package(s) 18 were picked up and the item(s) that have been picked up.

Figure 12:
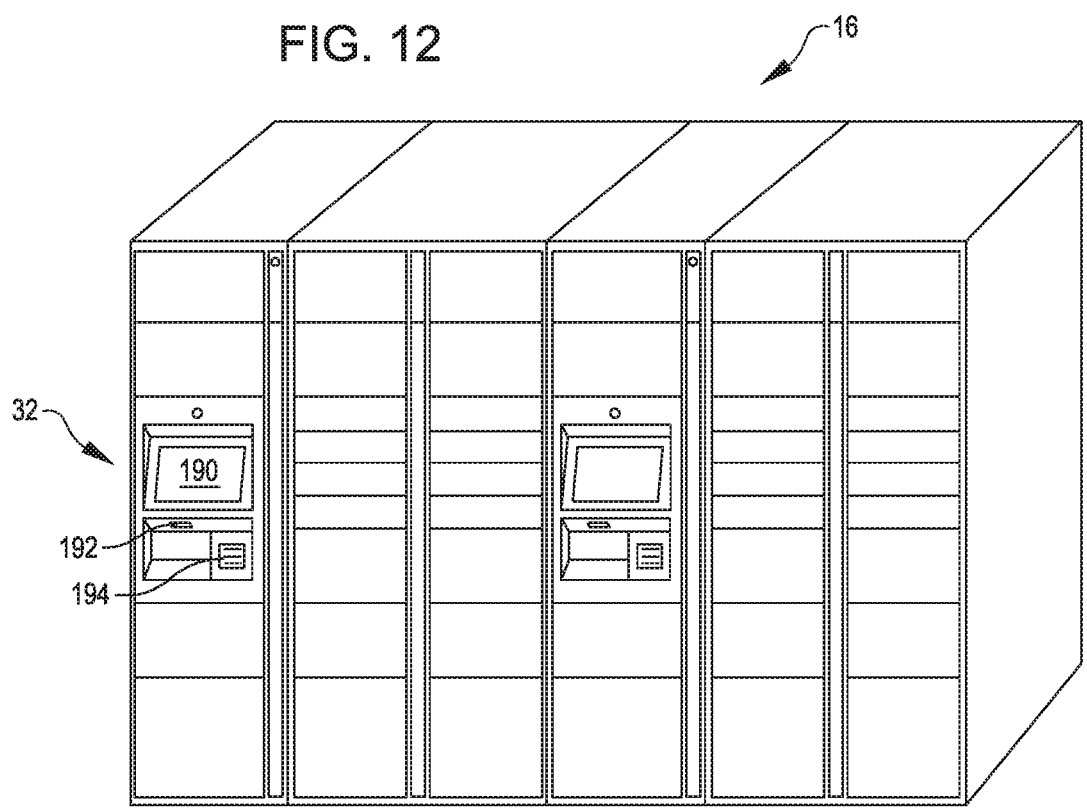
FIG. 12 illustrates locker assemblies for use in delivering packages to purchasers, in accordance with many embodiments.
Figure 13:
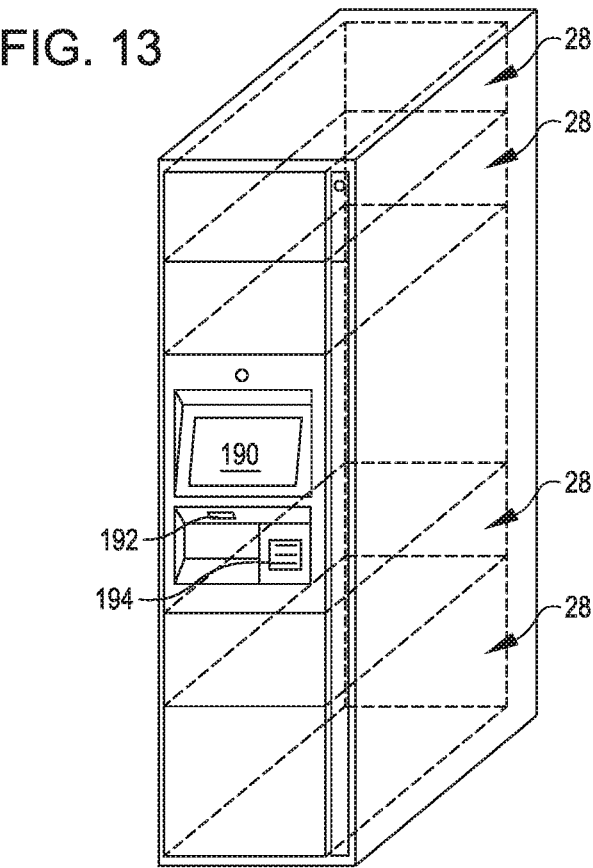
FIG. 13 illustrates a locker starter assembly for use in delivering packages to purchasers, in accordance with many embodiments.

FIG. 12 illustrates an embodiment of the locker assembly 16. The front side of the locker assembly 16 is shown. The illustrated embodiment includes two customer input devices 32 and six columns of lockers. Each of the customer input devices 32 includes a display 190, an imaging device, e.g., a scanner 192, and an input keypad 194. The scanner 192 is configured and operable to scan an access code such as the bar code 140 shown in FIG. 10 from the display of the customer's smart phone 112. The input keypad 194 is configured and operable for use by the customer to input an access code such as the access code 142 shown in FIG. 10. FIG. 13 illustrates a single column of the locker assembly 16 that includes one of the customer input devices 32 and four lockers 28 extending from the front side of the locker assembly 16 to the rear side of the locker assembly 16.

Figure 14:
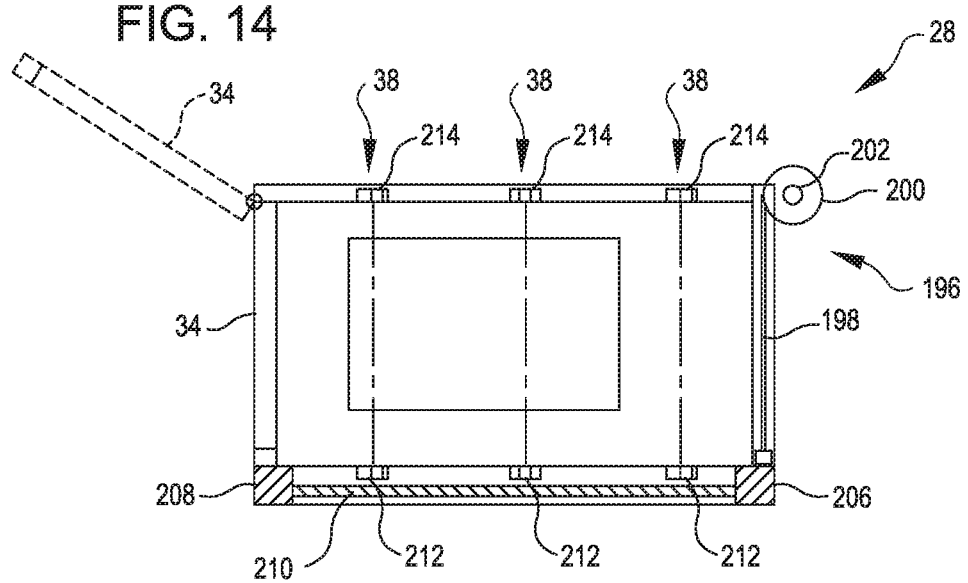
FIG. 14 is a plan view schematically illustrating a locker for delivering a package to a purchaser, in accordance with many embodiments.
Figure 15:
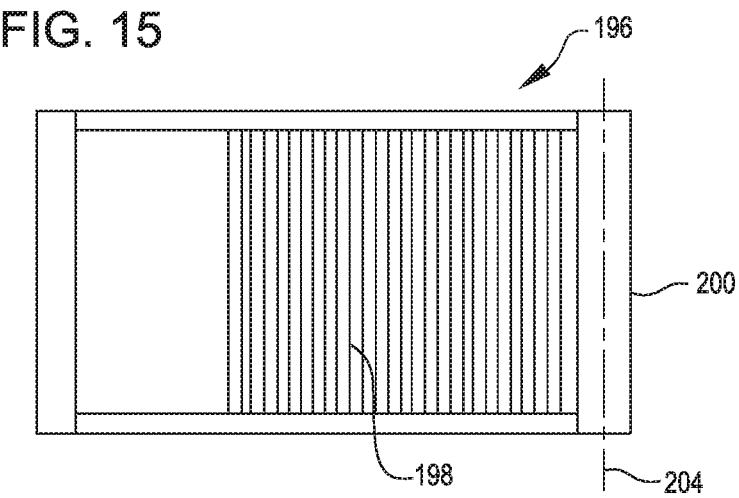
FIG. 15 is a rear view schematically illustrating the locker of FIG. 14, in accordance with many embodiments.

FIG. 14 is a plan view schematically illustrating an embodiment of the locker 28, in accordance with many embodiments. The illustrated embodiment of the locker 28 includes the front door 34 and a rear door assembly 196 that includes a retractable rear door curtain 198. The rear door assembly 196 is reconfigurable between a closed configuration illustrated in FIG. 14 in which the rear door curtain 198 extends across the rear opening of the locker 28 so as to close the rear opening and an open configuration in which the rear door curtain 198 is stowed in a rolled-up configuration within a circular end housing 200. FIG. 15 is a rear view schematically illustrating the rear door assembly 196 in an intermediate configuration between the closed and open configurations. In many embodiments, the rear door curtain 198 is coupled to a rotatable shaft 202 that is mounted to rotate about a rotation axis 204. The rear door assembly 196 can be reconfigured from the open configuration to the closed configuration by an operator pulling the rear door curtain 198 across the rear opening into the configuration shown in FIG. 14. The locker 28 can include a rear door latch mechanism 206 configured to interface with the rear door curtain 198 to maintain the rear door assembly 196 in the closed configuration. The locker 28 can include a front door latch mechanism 208 configured to interface with the front door 34 to maintain the front door 34 in the closed configuration. The locker 28 can include a coupling mechanism 210 that is configured to release the rear door latch mechanism 206 in response to closing of the front door 34. In many embodiments, the rear door assembly 196 includes a torsional spring coupled to the rotatable shaft 202 and configured to bias the rear door assembly 196 towards the open configuration. In such embodiments, release of the rear door latch mechanism 206 via closing of the front door 34 results in automatic reconfiguration of the rear door assembly 196 from the closed configuration to the open configuration. Other suitable ways of automatically opening a rear door of a locker can be used to open the rear door assembly at a suitable time. For example, a rear door assembly can include a spring assembly that biases the rear door to open upon releasing a solenoid operated latch. Other embodiments may include hinged, rotating, sliding, removable or other types and configurations of door assemblies.

Also shown in FIG. 14 are the package sensors 38, which can include light emitting elements 212 and respective light detecting elements 214. The light detecting elements 214 are positioned to receive light emitted by the light emitting elements 212 if not blocked by a package(s) 18 disposed within the locker 28. Alternatively, the package sensors 38 may comprise other types of sensors including weight or pressure sensors, proximity sensors, or other sensors based on various sensing technologies.

Figure 16:
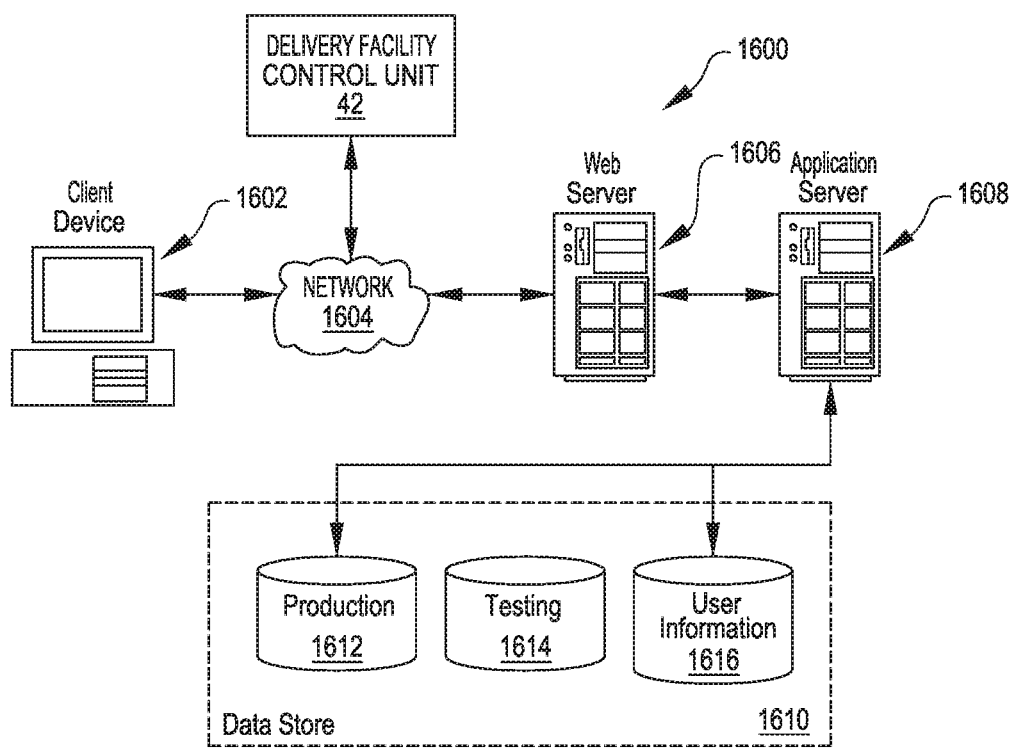
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The environment 1600 includes the delivery facility control unit 42 as described herein and illustrated in FIG. 2. In many embodiments, the functionality described herein with respect to control of delivery of packages to customers via the on-demand locker facility 10 is controlled via a combination of the application server 1608 and the delivery facility control unit 42.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A computer-implemented method of staging delivery of a package to a customer, the method comprising:
    causing, by a computer system when the package is available for pickup by the customer, a network link that is selectable by the customer to be displayed on an electronic client device; and in response to receiving, by the computer system, an indication generated by the electronic client device in response to the network link displayed on the electronic device being selected, performing a package pickup process comprising:
- initiating, by the computer system, transfer of the package to a locker of a plurality of lockers, the locker having a closed configuration that blocks access to the package by the customer;
- sending, by the computer system, an access code to the electronic client device that, when entered via an input device, enables access to the locker to retrieve the package;
- receiving, by the computer system, entry of the access code; and
- in response to receipt of the access code, reconfiguring, by the computer system, the locker from the closed configuration into an open configuration that provides the customer with access to the package to retrieve the package from the locker.

2. The computer-implemented method of claim 1, the package pickup process further comprising, sending to the electronic client device, by the computer system, an estimated wait time before the customer can retrieve the package from the locker.

3. The computer-implemented method of claim 1, wherein the plurality of lockers form part of a barrier wall having a front side and a back side, the front side being accessible to the customer for entry of the access code and retrieval of the package from the locker, the back side being inaccessible to the customer and configured for placement of the package into the locker.

4. The computer-implemented method of claim 1, wherein receiving entry of the access code comprises scanning the access code from a display of the electronic client device.

5. The computer-implemented method of claim 1, the package pickup process further comprising:
- detecting, via one or more package sensors, removal of the package from the locker; and
- sending, by the computer system, a message to the electronic client device that indicates that the package has been picked up.

6. The computer-implemented method of claim 1, further comprising receiving, by the computer system, a selection by the customer of a selected facility from a plurality of facilities from which the customer can pick up the package.

7. The computer-implemented method of claim 6, further comprising causing, by the computer system, shipment of the package to the selected facility.

8. The computer-implemented method of claim 1, wherein the package pickup process further comprises, after initiating transfer of the package to the locker, sending to the electronic client device, by the computer system, an estimated wait time before the customer can retrieve the package from the locker.

9. The computer-implemented method of claim 1, wherein the package pickup process further comprises:
- sending to the electronic client device, by the computer system, a notification of a time period for picking up the package from the locker together with the access code;
- tracking, by the computer system, elapsed time from the sending of the access code to the electronic client device; and
- in response to the package not being retrieved from the locker prior to elapsing of the time period:
  - instructing, by the computer system, removal of the package from the locker;
  - sending to the electronic client device, by the computer system, a notification that the time period has elapsed; and
  - causing, by the computer system, a prompt to be displayed on the electronic client device that is selectable by the customer to restart the package pickup process.

10. The computer-implemented method of claim 1, wherein the package pickup process further comprises:
- sending to the electronic client device, by the computer system, a notification that the package is being retrieved; and
- sending to the electronic client device, by the computer system, an estimated time period until the package will be ready for pickup by the customer.

11. The computer-implemented method of claim 1, wherein:
- the method further comprising storing, by the computer system, an identification of the package and an identification of a storage location where the package is stored, the identification of the package and the identification of the storage location being stored in a memory storage device; and
- the package pickup process further comprises retrieving, by the computer system, the identification of the package and the identification of the storage location from the memory storage device.

12. A system for delivering a package to a customer, the system comprising:
- a server operatively coupled to a network, the server comprising one or more processors and memory storing instructions that when executed by the one or more processors cause the one or more processors to:
  - cause a network link to be displayed on an electronic client device when the package is available for pickup by the customer, wherein the network link is selectable by the customer to initiate staging of the package to one of a plurality of lockers for retrieval by the customer;
  - in response to the network link being selected:
    - cause the package to be placed into the one of the plurality of lockers; and
    - send an access code to the electronic client device for accessing the one of the plurality of lockers for retrieval of the package,
- wherein a backside of each of the plurality of lockers is inaccessible to the customer,
- wherein each of the plurality of lockers includes a front door that automatically opens in response to input of the access code corresponding to a package placed within the locker, and
- wherein each of the plurality of lockers includes a back door reconfigurable between an open configuration enabling placement of a package into the locker, and a closed configuration inhibiting the ability for a customer to see through the locker and blocking access through the locker.

13. The system of claim 12, wherein:
each of the plurality of lockers includes one or more sensors configured to sense a package disposed within the locker; and
the instructions further cause the one or more processors to:

receive a signal generated via the one or more sensors indicative of removal of the package from the locker; and send a message to the electronic client device indicating that the package has been picked up.

14. The system of claim 12, wherein the back door automatically reconfigures from the closed configuration to the open configuration upon closing of the front door.

15. The system of claim 12, wherein the back door comprises:
   a shaft mounted to rotate about a rotation axis;
   a door curtain coupled to the shaft;
   a latch mechanism that interfaces with the door curtain to restrain the back door in the closed configuration; and
   a coupling mechanism that releases the latch mechanism in response to closing of the front door.

16. The system of claim 12, wherein the instructions further cause the one or more processors to:
   receive and store an identification of the package and an identification of a storage location where the package is stored to a memory device; and
   in response to the network link being selected, retrieve the identification of the package and the identification of the storage location from the memory device for use in retrieving the package from the storage location.

17. The system of claim 12, wherein the instructions further cause the one or more processors to:
   receive an input indicating that the package has been placed within the one of the plurality of lockers;
   send a time period for picking up the package to the electronic client device;
   track elapsed time from placement of the package into the one of the plurality of lockers;
   in response to the elapsed time exceeding the time period:
      output an indication that the package can be removed from the one of the plurality of lockers to enable use of the one of the plurality of lockers to deliver another package; and
      cause a notification to be displayed on the electronic client device indicating that the time period for picking up the package has elapsed and prompting the customer to restart the staging of the package to one of the plurality of lockers for retrieval by the customer.

18. The system of claim 12, wherein the instructions further cause the one or more processors to:
   cause a notification to be displayed on the electronic client device that the package is being retrieved; and
   send an estimation to the electronic client device of an amount of time that will elapse before the package is ready for pickup by the customer.

* * * * *